No. 657,908. Patented Sept. 18, 1900.
P. W. ALEXANDER.
SPEED REGULATOR FOR DYNAMOS.
(Application filed Feb. 7, 1900.)
(No Model.)
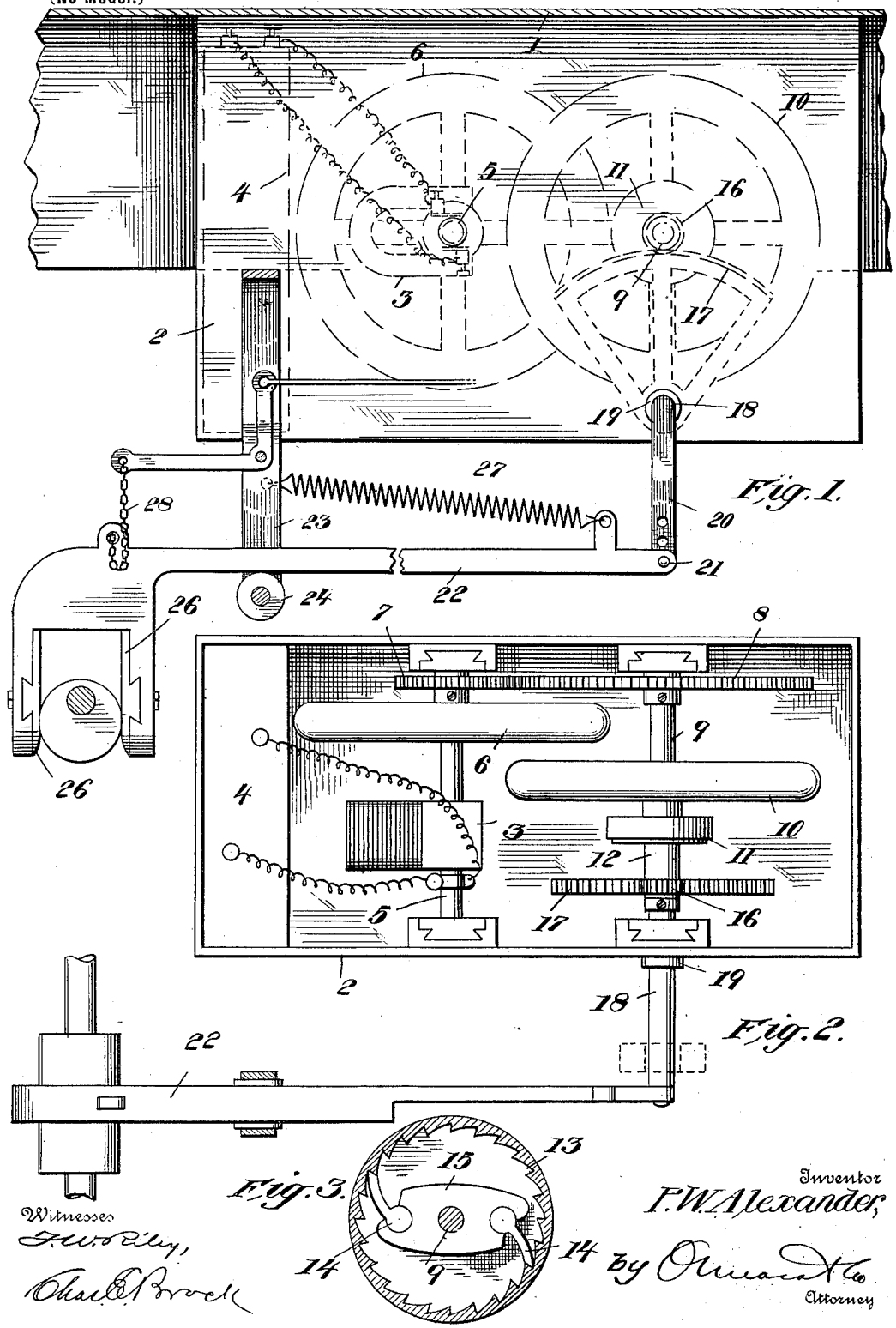

United States Patent Office.

PHILEMON W. ALEXANDER, OF TIFTON, GEORGIA, ASSIGNOR TO THE ALEXANDER COMPANY, OF SAME PLACE.

SPEED-REGULATOR FOR DYNAMOS.

SPECIFICATION forming part of Letters Patent No. 657,908, dated September 18, 1900.

Application filed February 7, 1900. Serial No. 4,387. (No model.)

*To all whom it may concern:*

Be it known that I, PHILEMON W. ALEXANDER, a citizen of the United States, residing at Tifton, in the county of Berrien and State of Georgia, have invented a new and useful Speed-Regulator for Dynamos, of which the following is a specification.

My invention relates to speed-regulators for dynamos, and has for its object to produce a device of this kind which can be applied to moving vehicles—as, for instance, passenger-coaches and the like—where it is desirable to generate electricity from some moving part for immediate use or for storage, as in a battery, for subsequent use for light or heat. In devices of this kind it is necessary that the generator should always run in the same direction and at substantially a uniform rate of speed, while the car upon which it is located may be run in either direction and at variable rates of speed. Owing to the fact that the mechanism is generally applied to the under side of the car, so as to be operated by the rotation of the axle, it is necessary that the operating parts be as completely protected from the dust as possible.

With these objects in view my invention consists in the improved construction and novel combination of parts of an electric generator, as will be hereinafter more fully set forth.

In the accompanying drawings, in which the same reference-numerals indicate corresponding parts in each of the views in which they occur, Figure 1 is a side elevation of so much of a car as is necessary with my improved generator in position thereon. Fig. 2 is a top plan view of my improved generator, and Fig. 3 is a detail view of the pawl-and-ratchet mechanism.

Referring more particularly to the drawings, 1 indicates the car, which may be of any desired form and structure, to the bottom of which a case or box 2 is secured in any approved manner and within which box the main portion of the operating elements of my improved generator are located. This box or casing is made as nearly dust-proof as it is possible to make it to prevent the entrance of the dust which is constantly being raised by the rapid movement of the train.

3 indicates the dynamo, which may be of any suitable size and dimensions for generating the electricity, and is provided with wires leading directly to the point of consumption or, preferably, to the storage battery 4 in one end of the casing, from which the electricity may be conducted as desired.

As the particular form and construction of the dynamo and storage battery may be varied to suit conditions or circumstances, I have not thought it necessary to further illustrate or describe them. The dynamo may be connected directly with the shaft 5 by a train of gearing or indirectly by means of ordinary gearing. The shaft 5 is provided with a flywheel 6 and a small pinion 7, which is driven from a gear-wheel 8 upon a shaft 9. The shaft 9 is also preferably provided with a flywheel 10 and a ratchet 11, one member of which is rigidly secured to the shaft and the other member is connected with a sleeve 12, which is loosely mounted upon the shaft in position to engage with and rotate the shaft when moved in one direction. This ratchet mechanism may be of any desired construction, although I have provided the rigid member with an overhanging interiorly-toothed flange 13, and the sleeve with two oppositely-located pawls 14, which are pivotally mounted at the ends of a cross-head 15. The sleeve is further provided with a gear-pinion 16, which is oscillated by means of a gear-segment 17, which is secured to the inner end of a shaft 18, which projects through the suitably-packed or otherwise dust-proof bearing 19 in the side of the box 2. The shaft 18 is of such a length as to extend from the box substantially to the center of the car, where it may be supported by means of an ordinary hanger and is provided with an arm 20, the free end of which is preferably perforated, as shown at 21. Pivotally secured to the free end of the arm 20 at one of the perforations is a reciprocatory bar 22, the opposite end of which is suitably supported, so as to be moved back and forth, as by means of a bracket 23 and a roller or pin 24. The slotted end of said bar is preferably bifurcated, so as to straddle the axle of the car and engage with an eccentric 25, which is rigidly secured to the axle. The inner faces of the bifurcations of the bar are provided with removable shoes or contact-pieces 26, which engage with the surface of the eccentric, which may be removed when they become worn out or broken. The eccentric, which is secured to the center of the axle, is preferably two feet long or more, so as to permit of the lateral movement of the car-body laterally without disengaging the bifurcated portion of the bar from the eccentric, as in passing around curves. Connected with the reciprocatory bar at any convenient point is a coiled spring 27, which has its opposite end connected with any suitable stationary part—as, for instance, the bottom of the car—which will have a tendency to normally return the bar to its retracted position. The tension of this spring is preferably equal to one-half of the power required to run the dynamo, so that the retraction of the spring will assist in moving the bar to its retracted position, thereby equalizing the strain upon the operating parts. In this manner when the bar is thrust forward the pawls are disconnected from the ratchets and without the use of the spring the force required would be merely nominal, while with the use of the spring one-half of the power required to run the dynamo is necessary to overcome the tension of the spring and move the bar forward; but as soon as the bar has reached its forward limit and starts on its return movement the spring exerts a part of the force necessary to run the dynamo, and it is only required that the eccentric exert the remaining portion.

Instead of using the form of eccentric and bifurcated bar that I have shown, it is evident that the ordinary eccentric, with the strap form of connection between it and the bar, or any other desired means of imparting a reciprocatory motion to the bar could be utilized. It is also evident that ball-bearings of any approved form or construction could be used for the support of the bearings of the shafts of the gearing and of the dynamo.

As above described, it is evident that my improved electrical generator can be applied to the ordinary car by simply providing the axle with an eccentric, as by having a split or divided eccentric, which may be clamped upon the axle in any desired manner. The box can be secured to or suspended from the under side of the car in position to have the free end of the arm 20 connected with the forward end of the reciprocatory bar 21.

The speed of the dynamo can be regulated to correspond with the speed at which the car is to be moved by changing the point of connection between the bearing with the arm toward or from the pivotal point of the arm at the bearing 19. As the train of gearing to run the dynamo will only be driven in one direction by the ratchet and is provided with two fly-wheels it is evident that the dynamo will be run with a substantially-uniform movement, and thereby produce the most satisfactory results. By inclosing the parts in the dust-proof box they will be protected from the action of the dust, and, if desired, antifriction-bearings may be inserted in the yoke of the reciprocatory bar to avoid unnecessary wear from the accumulation of dust, and by operating the ratchet mechanism by means of a cam or eccentric upon the shaft of the car-wheel it will make no difference which direction the wheel and shaft rotate, and therefore the car can be run either end forward in the train and produce the same result.

By letting the bar 22 rest loosely upon the pin 24 and providing a suitable lifting means—as, for instance, a cord or chain 28—the yoke of the bar may be lifted up, so as to be disengaged from the cam, and thereby render the generator inoperative, so as to render the device applicable for use upon automobiles and such like vehicles. In this manner the generator may be disengaged from the axle when going uphill, but connected thereto when going downhill, and thereby utilize the momentum of the vehicle for generating electricity and supplying it in the battery, to be subsequently used in propelling the vehicle or in going uphill. If the lower ends of the yoke of the bar should not register with the eccentric when it is lowered into position, they will rest upon the surface of the eccentric until the shaft has made a half-revolution, when the parts will occupy their original position and the yoke will pass down over the eccentric and the machine will operate the same as before. If desired, the lower ends of the yoke may be slightly beveled or inclined upon their inner surfaces, so as to more readily pass down over the sides of the eccentric.

Having thus fully described my invention, what I claim as new, and desire to secure by Letters Patent of the United States, is—

1. In an electrical generator, the combination, with a dynamo, of a train of gearing provided with a fly-wheel and a ratchet connection, reciprocatory mechanism for operating the gearing, and an eccentric for connecting said mechanism with the axle of a car, substantially as described.

2. In an electrical generator, the combination, with a dynamo, of a train of gearing provided with a fly-wheel and a ratchet, a segmental gear, and a reciprocatory bar adjustably connected with the segmental gear, substantially as described.

3. In an electrical generator, the combination, with a dynamo, of a train of gearing provided with a fly-wheel and a ratchet, one part of the ratchet being connected rigidly with one of the shafts of the gearing, and the other one is on a sleeve on said shaft, a segmental gear for rotating the sleeve, a reciprocatory bar for operating the gear, and means for connecting the bar with the axle of a car, substantially as described.

4. In an electrical generator, the combination, with a dynamo, of a train of gearing provided with a fly-wheel and a ratchet, of a reciprocatory bar connected with the ratchet, a spring for assisting in moving the bar in one direction and a cam for connecting the bar with the axle of a car, substantially as described.

5. In an electrical generator, the combination, with a dynamo, of a train of gearing provided with a fly-wheel and a ratchet, a segmental gearing provided with an arm, a reciprocatory bar adjustably secured at one end to said arm, and a coiled spring, one end of which is rigid, and the other end is secured to said reciprocatory bar, substantially as described.

6. In an electrical generator, the combination, with a dynamo, of a train of gearing provided with a fly-wheel and ratchet, one part of the ratchet being rigidly secured to one of the shafts of the gearing and comprising a disk the periphery of which is in the form of an overhanging internally-toothed flange, and the other portion of the ratchet is in the form of a sleeve, one end of which fits within the flange of the rigid portion, and is provided with opposite pawls for engaging therewith and the other end is provided with a pinion, a segmental gear in engagement with said pinion, and a reciprocatory bar for operating said segmental gear and pinion, substantially as described.

7. In an electrical generator, the combination, with a case, of a dynamo therein, a train of gearing for operating the dynamo provided with a fly-wheel and a ratchet connection, a shaft projecting through one side of the case, the inner end of which is provided with a segmental gear and the outer end is provided with an arm, the free end of which is provided with a series of perforations, the reciprocatory bar adjustably connected with the perforated end of said arm, and a spring connected with said bar, substantially as described.

8. In a speed-regulator for dynamos, the combination, with a car-body, of a case secured to the under side thereof, a dynamo, a storage battery, and a train of gearing within said case, a gearing for operating the train of gearing, the shaft of which projects through the side of the case and is provided with an arm at its outer end, a reciprocatory bar connected with said arm at one end and having its opposite end eccentrically connected with the car-axle, substantially as described.

9. In a speed-regulator for dynamos, the combination, with a car, of a case secured to the under side thereof, a dynamo, a storage battery, and a train of gearing within the case, said bearing being provided with a fly-wheel and a ratchet, a segment for operating the train of gearing provided with an arm, a reciprocatory bar adjustably secured to said arm at one end, and having its opposite end slotted and bifurcated to form a yoke, a bracket secured to the car and provided with a pin through said slot to hold the bifurcated end of the bar astride the car-axle, removable shoes upon the inner faces of the bifurcated ends of the bar and an eccentric upon the axle extending to a distance upon each side of the bracket, substantially as described.

10. The combination, with an electrically-propelled vehicle, provided with a generator and a storage battery the axle of said vehicle being provided with an eccentric, of means for intermittently supplying power to the generator, a reciprocatory bar connected therewith, one end of which is detachably connected with said eccentric, and means for detaching said bar, substantially as described.

PHILEMON W. ALEXANDER.

Witnesses:
 CHAS. E. BROCK,
 CLARENCE SHAW.